6 Sheets—Sheet 1.
J. J. C. SMITH & C. GRASSER.
MANUFACTURE OF RUBBER ARTICLES.
No. 178,479. Patented June 6, 1876.
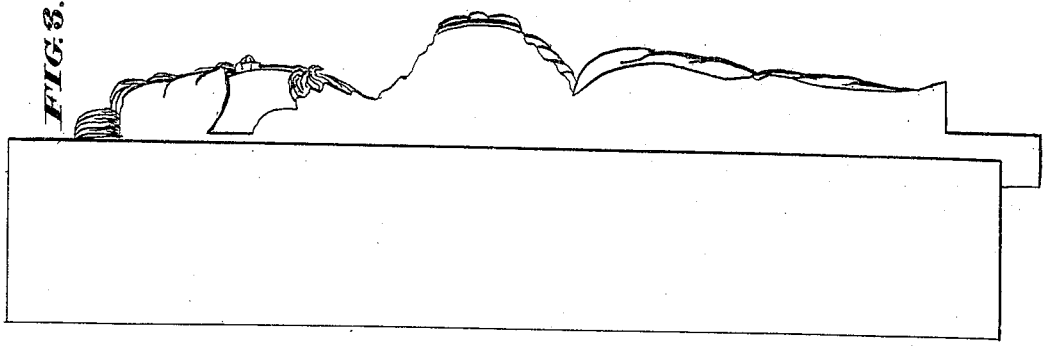
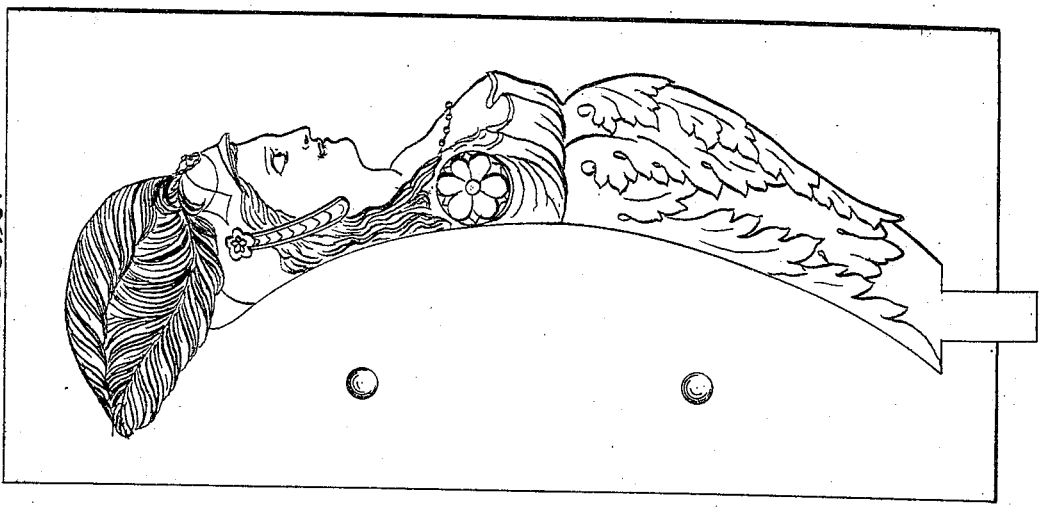
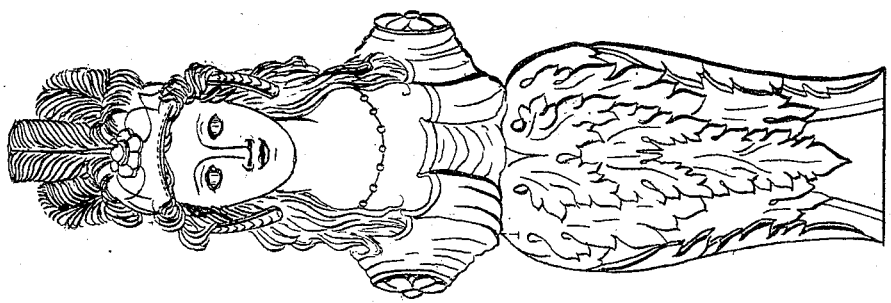
WITNESSES
Chas. J. Gooch
Le Blond. Burdett
INVENTORS
J. J. C. Smith
Charles Grasser
By Knight Bros. Attorneys
N. PETERS, PHOTO-LITHOGRAPHER, WASHINGTON, D. C.

J. J. C. SMITH & C. GRASSER.
MANUFACTURE OF RUBBER ARTICLES.

No. 178,479. Patented June 6. 1876.

WITNESSES
Chas J Gooch
Le Blond. Burdett

INVENTORS
J. J. C. Smith
Charles Grasser
By Knight Bros Attorneys

6 Sheets—Sheet 3.
J. J. C. SMITH & C. GRASSER.
MANUFACTURE OF RUBBER ARTICLES.
No. 178,479. Patented June 6, 1876.
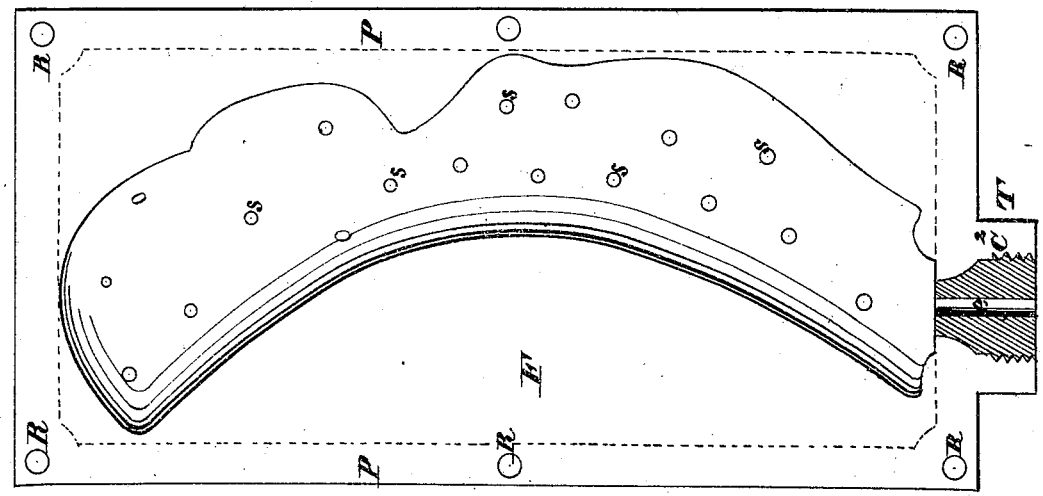
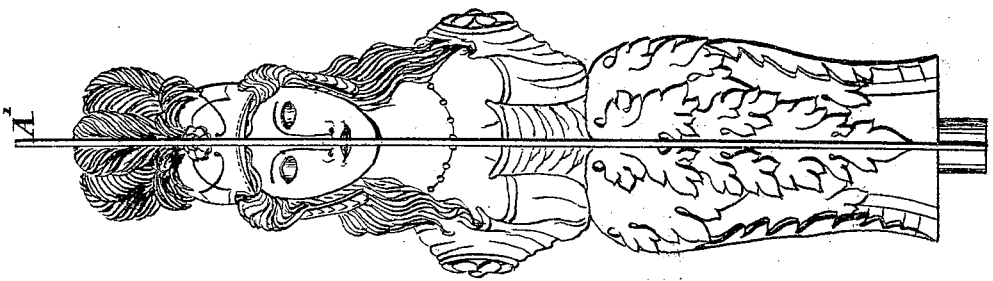
WITNESSES
Chas J Gooch
Le Blond. Burdett
INVENTORS
J. J. C. Smith
Charles Grasser
By Knight Bros Attorneys J. J. C. SMITH & C. GRASSER.
MANUFACTURE OF RUBBER ARTICLES.
No. 178,479. Patented June 6, 1876.
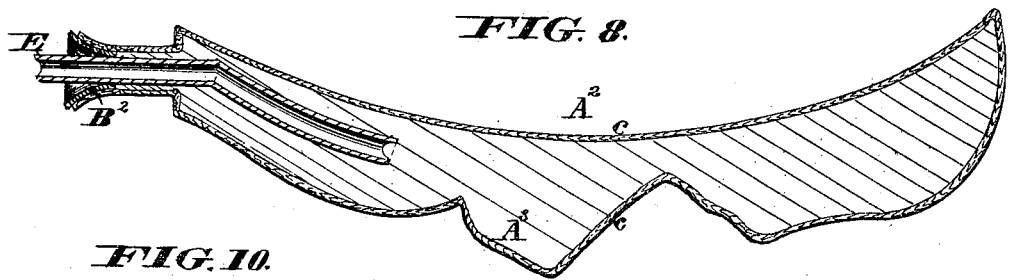
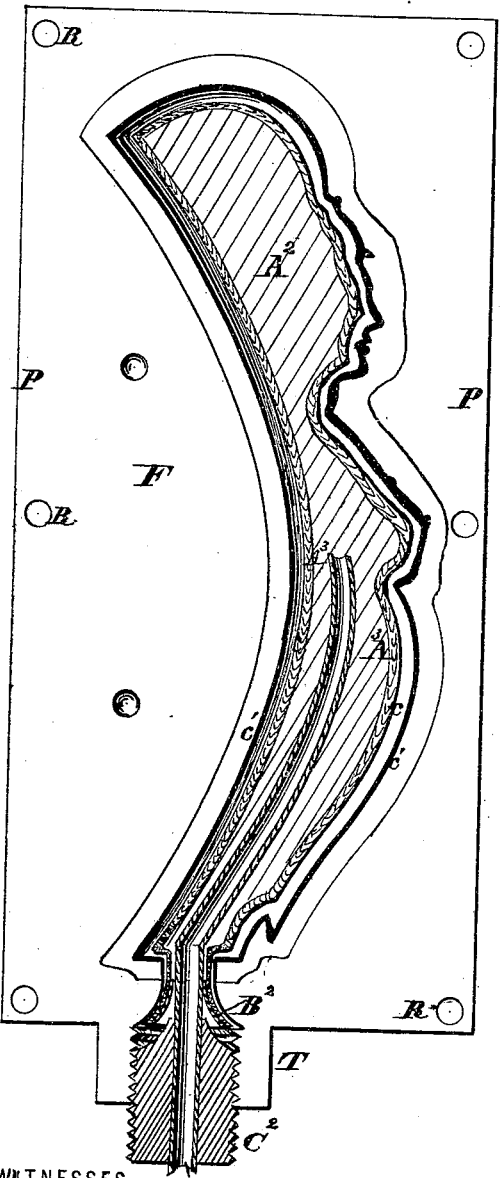
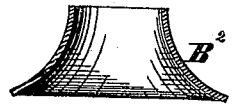
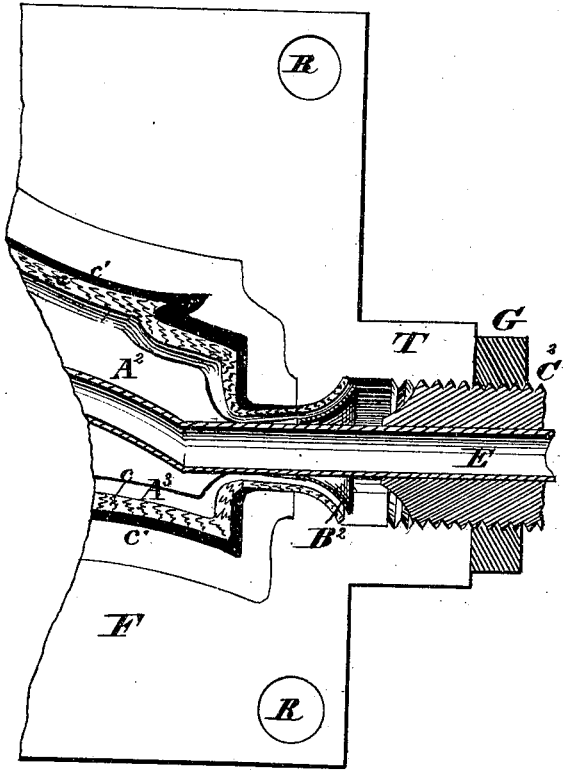

6 Sheets—Sheet 5.
J. J. C. SMITH & C. GRASSER.
MANUFACTURE OF RUBBER ARTICLES.
No. 178,479. Patented June 6, 1876.
FIG. 12.
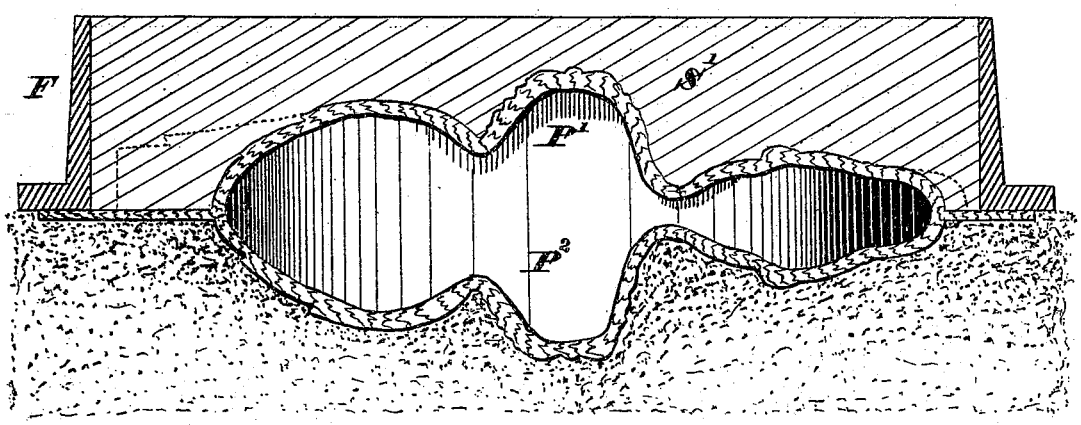
FIG. 12.ª
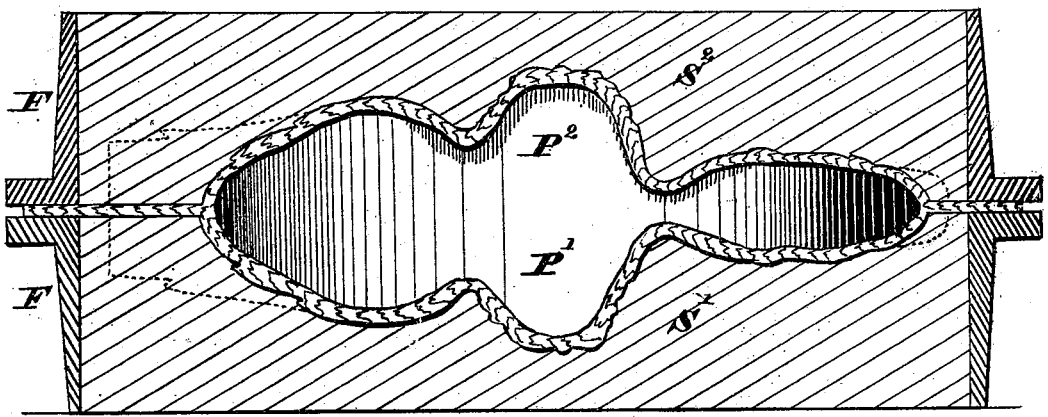
WITNESSES
Chas. J. Gooch
Le Blond. Burdett
INVENTORS
J. J. C. Smith.
Charles Grasser
By Knight Bros. Attorneys 6 Sheets—Sheet 6.

J. J. C. SMITH & C. GRASSER.
MANUFACTURE OF RUBBER ARTICLES.

No. 178,479. Patented June 6, 1876.

UNITED STATES PATENT OFFICE.

JOHN J. C. SMITH AND CHARLES GRASSER, OF SOMERVILLE, MASS.

IMPROVEMENT IN THE MANUFACTURE OF RUBBER ARTICLES.

Specification forming part of Letters Patent No. 178,479, dated June 6, 1876; application filed February 19, 1876.

*To all whom it may concern:*

Be it known that we, JOHN JOSEPH CHARLES SMITH and CHARLES GRASSER, both of Somerville, in the county of Middlesex and State of Massachusetts, have invented certain new and useful Improvements in the Art of Molding India-Rubber Articles, of which the following is a specification:

The object of this invention is to produce, in a cheap and practical manner, highly-ornamented articles for a great variety of purposes, such as clock-cases, statuettes, vases, door-trimmings, cane and umbrella handles, &c., no great skill or labor being involved in producing true and perfect copies of an article designed and ornamented by the skill of the artist, and no serious difficulties being caused by undercut or projecting parts in the design and ornamentation.

Heretofore it has been a difficult and expensive task to make even small ornaments of hard rubber, and the design and shape of such as were made had to be such as to permit the use of a metal die or mold; and hence no undercut places could exist on such article, as these would not permit the withdrawing of the article from the metal die or mold. A further objection to the present system is found in the great expense of metal dies or molds, which have to be cut in hard metal. Our invention overcomes these and many other difficulties in the manufacture of ornamented rubber-goods, or articles of the character above stated.

The principal and essential requirements, in order to make such india-rubber goods practically and economically, are: first, that the molds or matrices in which the rubber is to be shaped and vulcanized be made in a cheap and practical manner; second, that such molds or matrices shall have the perfect and sharp outlines required in the article to be produced; third, that the molds or matrices be made rapidly and cheaply without regard to projections and undercut places in the shape or ornamentation of the article; fourth, that the molds shall be of such nature as to permit the easy removal of the article formed therein without injury to a delicate design or ornamentation; fifth, that the molds used shall be of a porous nature, so as to permit the escape of the air from the cavities of the mold, which air, if confined, would prevent a sharp impression of the rubber to the mold; sixth, that the mold shall be so arranged as to admit of an easy and ready introduction of the raw rubber; seventh, that the molds shall be capable of resisting the pressure required to force the rubber into them.

The material which we use for our molds is plaster-of-paris or calcined gypsum. We are well aware that plaster-of-paris molds have been used to a small extent in the making of certain things of india-rubber; but our invention consists more in the manner of making such plaster molds, and the manner of using them, by means of which an entirely new field is opened in the manufacture of india-rubber articles—especially so in the production of things which are used for ornamentation.

If plaster-of-paris molds are used for the purpose of forming a rubber article, a mold is required for every article made. Therefore, it is most important that such molds can be made at a low cost, and of such perfection as to avoid after or finishing work on the article. Furthermore, if a real meritorious and good article shall be produced, the shape or ornamentation of the article must not interfere or be a hinderance to the making of a mold from it. These objects we accomplish by making our patterns or models, as well as our plaster mold, in the manner and on the principle fully described in the contemporaneous application of CHARLES GRASSER for improvement in making molds. The said GRASSER being a joint inventor in the within-described improvements, we shall herein describe his improvements in making molds, with such alterations as may be necessary to make a practically useful mold on the principle described, when such molds are to be used for the special purpose of manufacture of india-rubber goods. Beside the method described by CHARLES GRASSER for making plaster molds, we have found that, in some instances, where but a small number of molds are wanted, an elastic pattern or model may be used which can be made of gelatine, or glue, or of printers'-roller composition.

We are aware that plaster-of-paris casts are taken from gelatine or glue molds, but such plaster casts are more or less defective, the cause of which is the softening and swelling of the glue produced by the water in the plaster.

In order to produce a perfect, sharp, and well-defined mold from a gelatine or glue pattern, we have had to discover a protecting medium, by means of which a plaster mold may be taken from a glue pattern, which is really useful for the purpose.

The use of an elastic pattern made of glue or such like compounds, for the purpose of making a plaster mold to be used in the manufacture of india-rubber articles, is a new and improved application of the elastic properties of glue. Heretofore glue has been only used in the art of stucco-work so far as it concerns the making of elastic molds, from which plaster-of-paris casts were taken; but we make a pattern of the glue, in order to obtain a plaster mold. This, as well as the before-mentioned improvements for the purpose of obtaining a sharp and perfect mold from a glue pattern, we consider to be new. A glue pattern, even if prepared in the manner hereinafter described, will yield or stand about two perfect plaster molds, after which the molds will not be as sharp as desired. Such glue patterns are or may be cast in a metal mold of the same construction as those used for making the elastic india-rubber pattern.

In the accompanying drawings, forming part of this specification, Figure 1 is a front view of a figure which is to be made in hard rubber, the making of which we shall describe as an illustration of the mode of carrying our invention into effect.

Fig. 2 is a side view of the same figure embedded in wax so deep as to leave one-half of the figure free, said wax bed extending all around the figure, so as to form a horizontal surface from the line of division.

Fig. 3 represents a rear view of the same figure and wax bed.

Figure 4:
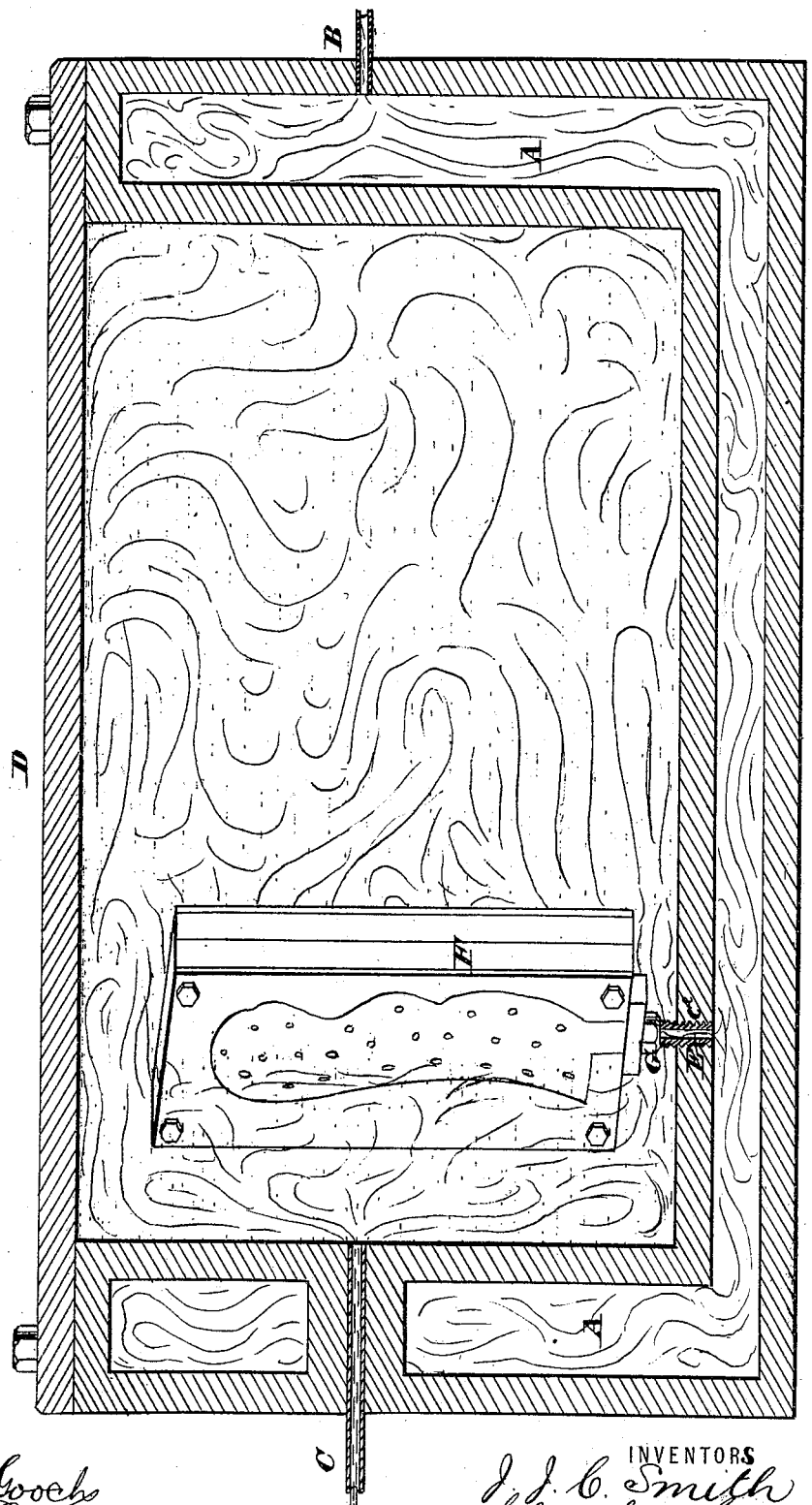

Fig. 4 represents a vertical longitudinal section of an apparatus which we use for vulcanizing or curing the rubber pattern, as well as for the vulcanizing of the rubber articles manufactured. Such apparatus is formed by the combination of two vessels in such a manner as to inclose a small one in a large one, having a space, A, between the two. Both vessels are connected at the top, thereby forming one body. The space A is connected, by a pipe, B, with a steam-generator, for the supply of steam to heat the vessel for curing the rubber. The inner vessel is provided and in connection with a pipe, C, by means of which it may be filled with water from the outside after the cover D is firmly and hermetically closed. The water introduced through pipe C is used to apply a uniform pressure of about eighty pounds to the square inch to the rubber of which the elastic pattern is made. In the subsequent use of the apparatus for vulcanizing rubber articles, as illustrated in the figure, and as hereinafter more particularly described, the same pipe C is used for the purpose of admitting steam to the inner chamber, and thus to the exterior of the mold, while the pipe E admits steam from the space A to the interior of the mold.

Fig. 5 represents a front view of the elastic rubber pattern, which is a copy of the original pattern or model, which has been sculptured in box-wood. The parallel lines $A^1$, running vertically through the center of the pattern, indicate the edge of a flange or partition extending all round the figure or pattern, dividing the same in two sides or halves, but connected by the same flange, so as to form but one body.

Fig. 6 represents a side view of the same pattern and its flange. At $B^1$ on said flange are blunt holes, or impressions of corresponding blunt points on the other side of the flange. These are for the purpose of forming depressions and points on the meeting face of the mold, to match or join the two parts thereof. C is a gate-print or projection, for the purpose of forming an impression or gate in the mold, through which steam may be admitted to the interior of the mold.

Fig. 7 represents the plan of a half-metal flask, which is used to inclose the plaster forming the mold, and serves the purpose of giving strength to the same. Said half-flask is provided with a flange, P, all around the irregular-shaped body of the flask. Two of such half-flasks are needed for each complete mold, which are firmly held together by screw-bolts passed through holes R in the flange.

The body of the flask is perforated by small holes $s$, for the purpose of giving vent to the air which is confined in the cavities of the mold. The flasks are further provided with a projection, T, which, if two half-flasks are correspondingly placed together, form a round boss, through the center of which is a hole, into which a screw-plug, $C^2$, may be screwed. Said screw-plug ends in a convex point, and has a hole, $e$, through the center.

Fig. 8 represents a vertical section of a plaster-of-paris core surrounded by an elastic vulcanized-rubber bag approximating to the shape of the figure. Said core and bag are used to place the rubber on, which is to form the ultimate product. E is a small tube extending within the core, for the purpose explained hereafter. At the outside end of the pipe E, and slipping over the same, is a small funnel-shaped thimble, B, made of tin, which is to serve as a soft yielding metal packing. By means of this soft-metal thimble and the screw-plug the funnel-shaped end of the rubber bag surrounding the plaster core is pressed to the metal flask, thereby forming a steam-tight joint.

Fig. 9 is a vertical section of said thimble on a larger scale.

Fig. 10 represents a vertical section of a plaster mold in the metal flask, already provided with a plaster core, $A^2$, enveloped by the elastic bag $A^3$, around which is laid the rubber $c$, to form the ultimate product. The heavy black line indicates the outline of the figure and a small space to be filled by the rubber as soon as expanded by the steam-pressure acting from the inside of the core, first against the elastic rubber envelope, and then on the raw rubber. $C^2$ is the screw-plug partly screwed in the boss T, the pipe E passing through the thimble $B^2$, ending in the hole through the center of the plug.

Fig. 11 represents a part of said mold, flask, &c., on a larger scale, with the addition of a jam-nut, G, on the screw-plug, for the purpose of setting the screw-plug firmly when fully screwed down on the thimble $B^2$, so as to prevent the turning of the plug when the whole is to be attached to the vulcanizing-vessel.

Description of the process and mode of operation: As it is impossible to describe all the little changes in the manipulations which may be required in the manufacture of the many differently-shaped articles which may be made of india-rubber by the use of our invention, we have to select a special one for description of the manipulations. The essential points and principle remain the same in all cases, and any one operating the invention has to exercise judgment how to apply the principles explained, when other things of different shapes are to be made.

The article we select for illustration is a figure to be used in the ornamentation of a clock-case. The original model or pattern is sculptured in box-wood. Ivory or such like material may be used instead; or it may be made of metal melting at a low temperature, for reasons to be seen hereafter. Such original model or pattern ought to made as perfect as possible, as on its perfection depends the perfection of all the copies taken or produced from it.

The first thing done is to obtain from such figure a perfect metal mold, parted in two halves. This object is most cheaply and effectively accomplished by means of the electrotype process. In order to do it in the best manner, we embed said figure in wax to a certain line of division, selecting as a line of division that part of the figure which will be least objectionable for a joint of the mold, and at the same time having regard to its adaptation for an easy insertion of the core. The wax bed has to extend in a horizontal direction from the line of division, as shown by Fig. 2. We make also two or more tapering cavities in the surface of the wax bed, which form corresponding taper points on the copper deposit, and which serve as steady or matching points for an exact jointing of the two halves of the mold.

When this is done, the model and upper surface of the wax bed are prepared in the well-known manner for taking a copper deposit by means of the electrotype process. As soon as the copper deposit is about as thick as a card the wax bed is removed, and the other side of the figure is prepared for and receives a like deposit, including the flange formed by the deposit on the surface of the wax bed, after which the deposit of copper is continued all over until a thickness of about one-sixteenth of an inch is obtained, which possesses sufficient strength for a mold, and admits of parting without injury, the center of the flange formed by the alternate deposits being the point of parting. On account of the many under-cut and projecting parts and places of the figure or model there is but one way of its removal from the mold without spoiling the metal mold. This is by destroying the model with fire, if of wood or such like combustible material. If of soft metal it will melt out. The copper mold formed over the model will resist the heat required without injury.

After the mold is parted in the manner indicated, and all remaining particles of the pattern or model are carefully cleaned out, the copper mold receives a coating or plating of brass by means of the electro process. Said brass coat or plating is followed by another coat or plating of tin, also applied by electro process. The coating or plating of tin has to be made as heavy as the mold will bear without injury to its sharpness and perfection.

Such plating of the mold is of great importance, and must be done with great care, and is for the purpose of protecting the copper mold against the destructive action of the sulphur in the rubber, as it is well known by india-rubber workers that copper molds cannot be used to vulcanize or cure rubber in them.

Excepting the plating of the copper mold in the manner and for the purpose stated, there is nothing new in the described production of a copper mold from a figure or other object, and it may be done by any one skilled in the art of electrotyping, and it has been only described to give a correct understanding of the entire manipulation to produce an elastic rubber pattern, so essential to the making of plaster molds.

When the copper mold is made and prepared in the manner stated, it is ready to receive the rubber for the elastic pattern. The rubber to be used must be pure caoutchouc mixed with a required quantity of sulphur to make soft and elastic rubber.

In order to produce a perfect pattern the process is as follows: First, a thin coating of soap-water or flexible collodion is applied to the mold. This coating is for the purpose of preventing the rubber from adhering to the mold after the process of curing. When such coating is dry, we apply a thin coating of a solution of raw rubber in benzine, so as to obtain a sticky or adhesive surface in the mold. When the last said coating is dry, the rubber may be introduced in each half-mold in the following manner: Small and suitable pieces of rubber are cut from a thin sheet, and are carefully laid into all the small cavities of the mold, each being firmly pressed to the mold, to which it will adhere. Great care must be taken to prevent the confinement of air in any of the cavities of the mold, which, if it takes place, will prevent a sharp and perfect impression. When all the cavities are filled, larger pieces of rubber are used and laid in until the whole interior surface of the mold, including the inner surface of the flange, is covered with a uniform layer of rubber. The first layer is followed by a second and third one, each being laid and pressed on carefully.

For a pattern of small size, the several layers of rubber need not be thicker than one-eighth of an inch; for large patterns greater thickness is required for imparting the necessary stability to the pattern.

When both half-molds are laid out with rubber in the manner stated, they are carefully jointed and pressed together by the flanges, so much as to squeeze the rubber partly out between the flanges, after which both halves are fastened together with some small screws through the flanges. At some convenient place a small hole of about one-half inch is left in the mold for the purpose of introducing water to the inside of the rubber pattern, the object of which will be explained in its place. After joining the two half-molds, as stated, a layer of rubber is applied to the outside of the mold. This outside layer must make a perfect connection with the rubber at the edges of the flange; also, over the edges of the small hole in the mold with the rubber at the inside of the same.

The rubber forming the elastic pattern will only take and retain a perfect impression of the mold by pressure applied during the whole process of curing it. To apply such necessary and uniform pressure to an irregular shape can only be done by immersing the whole under water confined in the interior vessel of the vulcanizing apparatus, under a pressure of about eighty pounds to the square inch. Therefore it is self-evident that great care should be taken to leave no spot in the layers of rubber through which the water could reach the inner metal surface of the mold, which, if it takes place, will prevent a sharp and perfect impression of the rubber to the mold.

To guard against such an emergency, the outside layer of rubber is applied, and is brought in firm combination with the rubber between the flange of the molds, and likewise over the edges of the opening or hole, with the rubber at the inside of the mold forming the pattern. By so doing the metal mold is fully and completely surrounded or enveloped in rubber, leaving no chance for the water to come between the metal surface of the mold and the rubber, except by a carelessly-made joint in the layers of rubber. At the same time the water may pass through the hole to the inside of the rubber pattern, so as to press the rubber to the mold from the inside.

When the mold has received the rubber in the way described, the whole is placed in the inside of the vulcanizing-vessel, made on the plan described, and represented by Fig. 4. The cover is firmly closed, and water is admitted and forced into the vessel through the pipe C, until a pressure of about eighty pounds to the square inch is reached. By means of this pressure the rubber is firmly pressed into every line and cavity of the mold, where it is kept during the whole time of vulcanizing.

The heat required to cure the rubber is produced by admitting steam to the space A through pipe B. The degree of heat, as well as length of time, will be regulated by the judgment of the operator, according to the mixture and quality of the rubber used.

To avoid blistering of the rubber, or a changing of shape after curing and while hot, the pressure is kept on until the whole is cooled. When perfectly cool the mold is removed, and the elastic pattern may be taken from the mold. This is done by cutting the outside layer of rubber from the edge of the flange and the mouth of the hole, and by a gradual and careful parting of the mold the elastic pattern may be drawn out, and is ready for use. This elastic pattern is a perfect impression of the mold, and a true copy of the original model.

By means of the layers of rubber between the flanges of the mold a rubber flange is formed all around the figure or pattern, dividing the same into halves, on a parallel line at the place of the joint, as seen by the drawings, Figs. 5 and 6. This rubber flange on the pattern is of great importance, and has to serve the useful purpose of forming the basis and parting partition of the plaster molds to be taken from the pattern; furthermore, it serves to keep the pattern in regular shape of contour or outline on the place of parting and jointing the half-molds—a matter of great importance, as it is very essential that the molds taken from the pattern shall join well at the contour or outline of the mold.

Making of plaster molds: The making of plaster molds from an elastic rubber pattern is on the same principle as described by CHARLES GRASSER in his application for a patent for improvements in making molds, and in this specification we shall follow his description in principle, but with such alterations as may be required to make the mold suitable for the special purpose of forming and curing india-rubber in such molds. A pattern or model of soft and elastic rubber is very easily pressed out of shape and distorted, even by a light weight. To avoid this a support is provided, which is done in this manner: first lay the elastic pattern on moist molding-sand, Fig. 12; bring it in its normal position, and imbed it in the sand in the same manner as it has been done with the original model in wax, taking care to get the flange of the pattern in its normal position. This done, a metal frame of sufficient size and depth is placed over the pattern, resting the edge of the frame on the rubber flange of the pattern. After this, plaster-of-paris is applied in every cavity and over the surface of the pattern, which is best done with a small brush. When this is done, the frame is filled with plaster up to the level of the top of the frame. When the plaster is hardened the whole is turned over, and another flask, like the first one used, is placed over the other side of the pattern, Fig. 12ª, in the same manner as foundrymen use their flasks in making molds from a pattern. The plaster is applied to the pattern as before stated, and finished as the first side was done. The first molds so formed are carefully parted. The elastic rubber pattern admits of so doing this, as it is a very yielding and elastic body compared with the hardened plaster. These two half-molds are used as the permanent supports of the elastic pattern. In order to make further operations more easily understood we shall call them half support-mold $S^1$ and half support-mold $S^2$; likewise we will call the elastic pattern, although it is in one body, half-pattern $P^1$, and half-pattern $P^2$. The support-molds are then adapted to permit the ready replacing of the rubber pattern. This is done by cutting out the projections, care being taken to preserve the edge or contour of the mold at the jointing-line. When this is done, the support-molds are ready for regular use.

Before proceeding further in the description it will be necessary to give some explanations in regard to plaster molds to be used in making of articles in hard rubber in such plaster molds. Plaster-of-paris is a very poor conductor of heat; therefore, if a plaster-of-paris mold is used to form and cure hard rubber in, it is very essential to make the body of the plaster forming the mold as thin as possible.

If the plaster mold is too thick in body, the vulcanizing of hard rubber will be imperfect, and the product worthless. Furthermore, a plaster mold by itself has no strength to resist expansive pressure, which is required if a plaster mold is to be used for forming an article in rubber of such a shape that it cannot be made solid. To overcome these obstacles is of great importance, and we overcome them by the use and application of a peculiarly-made flask or box. Such flasks must be made of strong metal, and in all cases must approximate to the shape of the article to be made in rubber, but must be somewhat larger, so as to admit of forming a plaster-of-paris lining on the interior. This plaster-of-paris lining receives the full and sharp outlines of a mold taken from the pattern.

Figure 13:
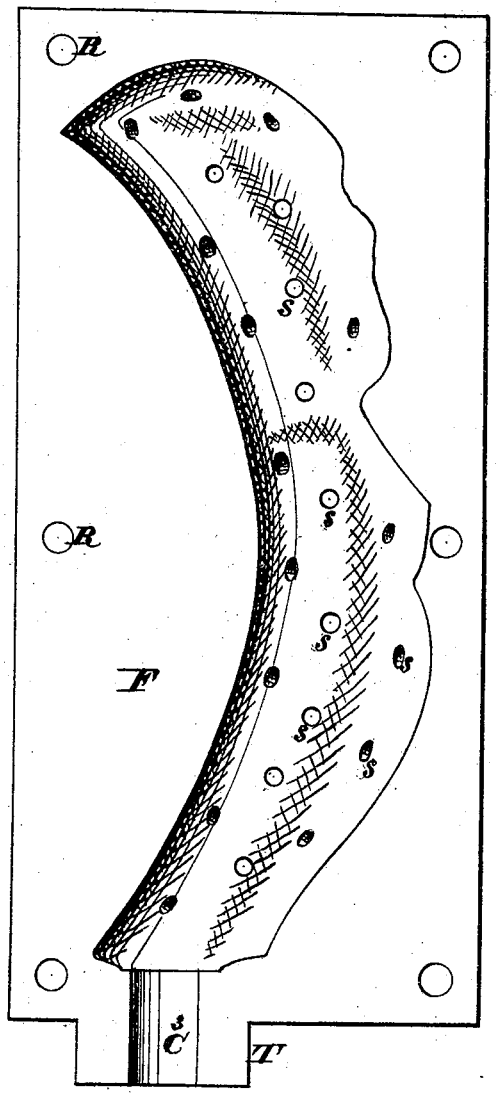
Figure 14:
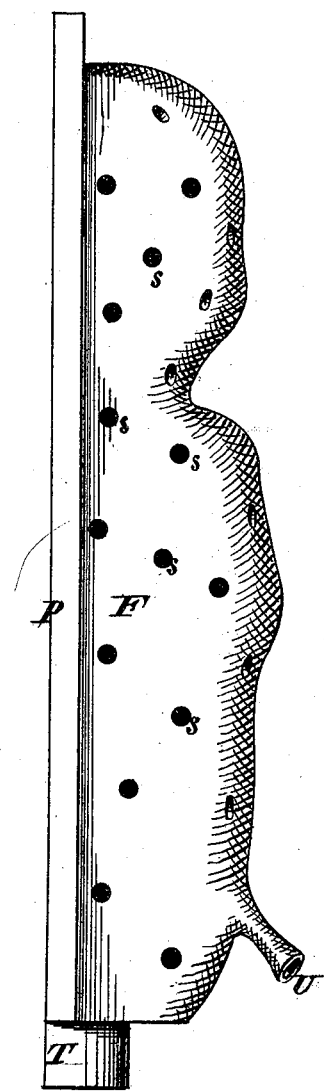

In Fig. 13, in the accompanying drawings, we represent a plan, and in Fig. 14 a side elevation, of a half of such flask, which is provided with a flange, P, for the purpose of holding two such halves together by means of screws passed through the holes R. The body or hollow part of the flask approaches to the shape of the figure selected for illustration, and is perforated by small holes $s$, to serve as vent-holes for the air in the plaster mold. At U is a funnel-shaped pipe or opening for the introduction of the plaster when the flask is closed on the pattern.

It is further necessary that all flasks used for a similar article be made and arranged in such a manner as to fit each other, and be interchangeable.

In making plaster molds for regular use to form india-rubber articles we proceed in the following manner: The elastic pattern receives first a coating with soap-water to prevent the adhesion of small particles from the plaster mold, after which the half-pattern $P^1$ is placed in half support-mold $S^1$. Then we apply the plaster by means of a small brush in every cavity of the pattern, and all over the same, until a uniform layer of plaster is all over the pattern; then we place a flask, such as above described, over the pattern, resting on the rubber flange in such a manner that the gate-print on the pattern corresponds and fits to opening $C^3$ on the flask. This done, we fill the remaining space in the flask with plaster through the funnel-shaped pipe U, previously closing the small perforations $s$ with wooden pegs. When the plaster is hardened the support-mold is removed, and then the elastic pattern is readily drawn from the mold. The other side of the pattern is then molded by placing half-pattern $P^2$ in half support-mold $S^2$, and following the same manipulations as before. As the flasks used are all interchangeable with each other, and are likewise so with the support-mold flasks by means of steady-pins, all molds so formed will join perfectly, as the use of a support-mold, made, arranged, and used in the manner stated, will invariably place the rubber pattern in the same position to all the flasks used.

So far this specification presents but few alterations from the description given by CHARLES GRASSER of his invention for making elastic rubber patterns and plaster molds; but in the following we shall give a description of the practical application of the said GRASSER'S invention, to make it useful in the manufacture of articles of india-rubber, including the manipulations which we have found to be necessary to produce a perfect article in rubber; also, the manipulation of taking a perfect and useful mold from a pattern made of gelatine, glue, or such like compositions, which mold may be used in the manufacture of india-rubber articles.

Making the rubber article: To form a somewhat large article of rubber in a plaster mold, especially if the article shall be hollow, and present undercut and projecting parts and places, requires different manipulation from what may be imagined at first sight, as there are numerous obstacles in the way. To press india-rubber in a form or mold requires considerable pressure, which has to be kept up until the rubber is cured. Therefore, metal molds are mostly used on account of their strength and conductibility of heat, and plaster molds have been only used to make such articles of rubber as could be formed in the plaster molds by pressure applied laterally to a flat surface. Hence, the common mode of using plaster molds does not involve special difficulties requiring invention to overcome them; but in order to form of rubber a perfect article in the shape of a clock-case figure, bust, door-knob, cane-handle, vase, and the great variety of articles of forms which present many undercut and projecting parts, requires manipulations altogether different from those used at present in the manufacture of rubber goods. It is true we apply a principle for obtaining pressure to our rubber during the process of curing, as it has been used similarly before this; but, in order to obtain a perfect, sharp, and smooth impression of the mold, we apply such pressure in a different manner, and with an effect essentially different, from what has been known before.

On account of the fragile nature of plaster it is impossible to press a body of rubber in such mold as it is done with metal molds, depending on the great pressure to force the surplus rubber out between the joints; but we are compelled to get our rubber into an approximate shape first before placing it in the mold, with proper care and judgment to use as little rubber as possible consistently with the required strength of the article; furthermore, we must provide some means by which we make the operation of giving the rubber its ultimate shape a certainty, so as not to produce more imperfect than perfect articles.

To effectually accomplish the object, we proceed as follows: After the plaster mold is made in the manner described, we make a plaster-of-paris core to said mold, which is smaller than the cavity of the mold, so that if it was placed in the mold a space of about five-sixteenths of an inch would remain between the core and the walls of the mold. Such core is made from a special mold for the purpose, in the same manner as foundrymen form cores for hollow castings.

Fig. 8 of the drawings represents a vertical section of a core such as is required for a figure given as an illustration. The inside shaded part is the plaster. The heavy white line C indicates an elastic rubber envelope of the plaster core, the purpose of which will be seen hereafter. A tube, E, is connected with the core during the making or forming of the same. At the outside end of the tube E, and slipped over the same, is a funnel-shaped thimble, $B^2$, made of soft pliable metal. It will also be noticed that the heavy white line indicating the elastic envelope comes nearly to the edge of the wider end of the thimble, indicating that the rubber envelope surrounds not only the core but part of the tube E, and the outside of the thimble $B^2$, the utility of which will be seen hereafter.

This elastic envelope of the core is made as follows: As soon as the plaster core is formed with the tube E attached to it, it is made dry and free from moisture, after which a coat of rubber solution is applied to give the core an adhesive surface. After this a layer of rubber, mixed in such a manner as to make soft and elastic rubber after curing, is laid on. This layer of rubber is applied all around the core, so as to form a perfect air-tight envelope over the same, including so much of the tube E and thimble $B^2$ as indicated above. This done, the core so enveloped, or any number of such cores, are placed in a common vulcanizing-vessel to cure the rubber envelope. When this is done, the core is ready for further use. The core has a shape approximating to that of the article to be made, and the next thing to be done is to apply such a thickness of raw rubber to this core as will admit of placing it in the plaster mold. The application of the raw rubber to the core is best done by cutting strips from a sheet of rubber about one-half inch wide and one-sixteenth inch thick, and wrapping them uniformly around the core on the elastic envelope until a required thickness is attained. Each layer ought to be well pressed on, to make a united mass of the whole. The mixture of the rubber applied on the core and envelope has to be according to the quality of the article wanted—either soft, semi-hard, or hard rubber.

After charging the core with the required quantity of rubber it is placed in the plaster-molds, which have received previously a coating of flexible collodion to prevent the adhesion of the plaster to the rubber article after curing the rubber. When the core is laid in one-half of the mold in such a manner that the tube E with the thimble $B^2$ fills the gate in the mold and flask, the other half-mold is placed over it, and both halves are firmly screwed together by the flanges of the flasks. The screw-plug $C^2$ is screwed in the boss T against the thimble $B^2$, which will spread and pack the rubber envelope, or rather that part of it lying against the outside of the thimble, firmly and air-tight within the taper hole in the base of the flask.

Figs. 10 and 11 of the drawings represent a vertical section of a mold so charged, and will clearly illustrate it.

F is the metal flask, and $c'$ the plaster lining forming the perfect mold. $A^2$ is the plaster core. $A^3$ is the elastic envelope. $c$ is the rubber, which is to form the ultimate product; E, the tube connected with the core; $B^2$, the metal thimble; $C^2$, the screw-plug; G, a jam-nut.

The pressure required to force the rubber into every cavity of the mold, and take a perfect impression of the same, is produced by connecting the charged mold, by means of the projecting end of the screw-plug $C^2$, with a corresponding screw-coupling in the bottom of the inner vessel of the vulcanizing apparatus, as represented by Fig. 4. Any number of charged molds may be attached in the same manner, according to the capacity of the vessel. After charging the vessel and closing the cover, steam is gradually admitted to the space A through the pipe B. The steam will also enter through the hole in the screw-plug $C^2$, and reaches, by the tube E, the center of the plaster core, finding its way through the pores of the plaster, and, acting on the inside of the elastic rubber envelope, will expand the same, which expansion will cause a uniform pressure on the irregular surface of the rubber, pressing it into every outline of the mold.

The importance of the elastic envelope will now be apparent, as it forms, so to say, the packing, preventing the steam from coming in direct contact with the plaster mold during the important process of imparting the sharp impression to the rubber. If the steam were allowed to act directly against the raw rubber it would usually tear it, as raw rubber becomes very soft when heated, and is not an elastic and tough material, as when cold or vulcanized. The sharp projections of a mold would cut it at some point, and the least broken spot would allow the steam to reach the plaster mold and prevent a perfect impression. Such a break is effectually prevented by the use of an elastic tough envelope or cover, which has been made so by a previous curing process.

The pressure of the steam in space A and on the inside of the mold is raised to about forty-five pounds to the square inch, and is kept so for about thirty minutes, during which time the rubber becomes fully softened, and gets a full impression of the mold; but such heat of steam at a pressure of forty-five pounds is not sufficient to make hard rubber, so it is gradually increased to about eighty-five pounds; but we found that even such a pressure and the consequent increase of heat would not produce a good hard rubber as long as it acted only on the inside of the mold; besides that, it would cause too great a strain on the flasks inclosing the plaster mold; therefore, we admit, also, steam to the inner vessel through the pipe E, but limit the pressure to only seventy pounds to the square inch. By so doing we obtain the required heat to make a good quality of hard rubber. This variable and unequal pressure is of great importance, as we have found it to be the only way to obtain a perfect sharp impression of the mold, with a reproduction of as smooth a surface as the mold presented.

The higher pressure on the inside of the mold keeps the rubber in close contact with the same, thereby preserving the full impression, as rubber is a very pliable and yielding substance while under such temperature, even when it is cured for hard rubber.

We have found that if the pressure were equally high on the outside of the mold, even after the process of curing was in an advanced state, the surface of the article presented a porous and rough surface, resulting, in many cases, in a disfiguration of the article; therefore, the principle of having a lower pressure on the outside of the molds is of great importance, if a perfect article is to be obtained. The time for curing rubber in this manner is about thus: forty-five to fifty pounds steam for thirty minutes on the inside of the mold alone, gradually increased to eighty-five pounds per square inch, with a corresponding lower pressure of seventy pounds per square inch on the outside of the mold or flask, which makes an aggregate time of two hours and thirty minutes. This is for hard rubber. Soft rubber is regulated according to the mixture.

After the process of vulcanizing in the manner stated, the molds are removed, and the articles may be taken from the molds. The plaster core has become soft and is readily removed by washing it out. The elastic envelope has become incorporated with the rubber forming the article, and becomes part of the same.

The foregoing description gives a full illustration how to proceed in the making of such articles as figures, clock-cases, vases, caskets, &c., where the article presents a closed or full body, and although the manipulations remain the same in principle, a saving of time may be effected in the making of flat-shaped things, such as bass-relief, or a dish presenting but one side to be finished or ornamented. The elastic pattern for molding such an article is made on the same principle as described. Likewise are the molds, and a corresponding flask is used; but as such flask would have a flat or dish shape it would not be necessary to use two half-flasks, as a simple plate provided with a boss for the screw-plug and connections will answer; also, the plaster core may be dispensed with, and in cases where the design of the article presents no great projections or deep cavities the elastic covering may fall away, as the raw rubber will admit of some stretching on a flat-shaped surface.

Figure 15:
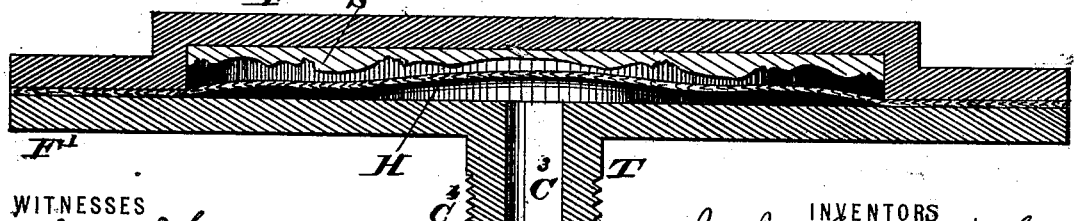

Fig. 15 represents a flask charged with rubber, ready for connection.

F is the flask; S, the plaster mold formed in the flask. H is the rubber extending over and squeezed between the flanges of the flasks and cover. F' is the cover to the flask with the boss T in the center, in which is a simple screw, $C^4$, with a hole, $C^3$, in said screw for the connection to the vulcanizer and the hole for the admission of steam. In all other essential things the manipulations remain the same.

It remains yet that we give a description of the mode of making a perfect plaster mold from a pattern or model made of gelatine, glue, or printers'-roll composition. We have found bone-glue the best for this purpose. We are well aware that plaster-of-paris casts have been made in glue molds; but such casts are more or less imperfect—the water in the plaster will swell and soften the glue, and the plaster will adhere to it, so that a plaster cast made on glue presents a rough soft surface, and hence fine and sharp outlines are almost lost. These defects would make a plaster mold taken from glue patterns worthless for our purpose, although they may be good for other purposes for which they are used at present.

By pursuing a series of experiments, we have found remedies for such defects, so that we may use glue patterns for making plaster molds from, answering our purpose in cases where a limited number of copies may be wanted. By applying a coating of a solution of caoutchouc in chloroform to a glue pattern, two or three perfect sharp plaster molds may be taken from it; or by the use of a strong solution of alum in water mixed with the plaster in place of water, the same result may be obtained. The latter is, however, more difficult to use, as the plaster sets almost too quickly even for a swift workman. Glue patterns may be cast in a metal mold, such as used for making elastic rubber pattern. A glue pattern should have a parting-flange similar to that of the rubber pattern.

As above stated, we are well aware that molds of plaster-of-paris have been used to shape india-rubber and vulcanize the same in such molds; but such molds presented only flat surfaces, to which the rubber was readily shaped and held by plates and screws, and we do not wish to be understood as claiming the use of plaster molds, broadly, but we regard as a novel feature in the manufacture of india-rubber goods the use of plaster molds taken from soft elastic patterns. We also do not wish to be understood as claiming in its broadest sense the application of steam-pressure to rubber for obtaining an impression of the same in a mold; but we regard as new the use of varied pressure during the process of vulcanizing and shaping rubber goods in plaster molds—that is to say, applying, first, a moderate pressure on that side of the rubber opposite the surface of the mold from which the impression is to be taken; secondly, an increase of steam-pressure; thirdly, the use of higher pressure on the inside of the rubber in a mold, and a lower pressure on the outside of the mold.

The other points in connection with our invention are within the knowledge of one skilled in the art, and require no description.

Having thus described our invention, the following is what we claim as new therein and of our invention and desire to secure by Letters Patent—

1. The combination of a metal flask, approximating to the shape of the article to be formed, with a plaster mold, substantially as herein described.

2. In the process of manufacturing rubber articles, the preliminary approximate shaping of the article by application to an internal support, and the subsequent application of an expanding steam-pressure, produced substantially as described, to force the material into contact with the interior of the mold.

3. In combination with a core, the elastic vulcanized-rubber envelope or covering, substantially as described, to prevent the rupture of the raw rubber when pressed into very deep cavities.

4. The combination of the flask F, plaster mold S, thimble $B^2$, tube E, and screw-plug $C^2$, as and for the purpose set forth.

5. The process of applying an internal steam pressure in excess of that on the outside of the article to be vulcanized, substantially as and for the purposes set forth.

J. J. C. SMITH.
CHARLES GRASSER.

Witnesses:
ALEXR. WOOD,
M. SMITH.